United States Patent [19]

Ono

[11] Patent Number: 4,871,191
[45] Date of Patent: Oct. 3, 1989

[54] WEBBING GUIDING STRUCTURE FOR AUTOMOBILE SEAT BELT SYSTEM

[75] Inventor: Katsuyasu Ono, Fujisawa, Japan
[73] Assignee: Nippon Seiko Kabushiki Kaisha, Tokyo, Japan
[21] Appl. No.: 196,065
[22] Filed: May 17, 1988
[30] Foreign Application Priority Data
   May 20, 1987 [JP] Japan ............... 52-75483[U]
[51] Int. Cl.⁴ ............................ B60R 22/06
[52] U.S. Cl. ................... 280/804; 280/808
[58] Field of Search .......... 280/804, 801, 802, 807, 280/808; 297/469, 483

[56]     References Cited
        U.S. PATENT DOCUMENTS 4,343,489  8/1982  Suzuki et al. .......... 280/804
   4,462,613  7/1984  Nishimura et al. ...... 280/804
   4,623,168 11/1986  Yokote ................ 280/804
   4,691,938  9/1987  Monsigny .............. 280/804

*Primary Examiner*—Richard A. Bertsch
*Attorney, Agent, or Firm*—Wegner & Bretschneider

[57]            ABSTRACT

A webbing guiding structure suitable for use in an automobile seat belt system includes a slide rail and a movable runner displaceable along the slide rail. The slide rail defines a slide surface for allowing the movable runner to run on the slide surface. The movable runner is provided with a slidable shoe at a position where the movable runner is brought into contact with the slide rail. A contact surface of the slidable shoe, which is brought into contact with the slide surface of the slide rail, and the slide surface are arranged at an angle relative to each other as viewed in a direction transverse to the slide rail.

10 Claims, 2 Drawing Sheets

WEBBING GUIDING STRUCTURE FOR AUTOMOBILE SEAT BELT SYSTEM

BACKGROUND OF THE INVENTION

1. Field of the Invention

This invention relates to a webbing guiding structure for an automobile seat belt system, and specifically to a reinforced structure of a slide rail and a movable runner for a passive seat belt system.

2. Description of the Related Art

In conventional seat belt systems, slidable shoes for movable runners had possibility inherent to their structures that a load would be concentrated on outer edge portions of the slidable shoes.

As illustrated by way of example in FIG. 4, slide surfaces 41 formed on upper walls of paired lips 43, which in combination define a gap 42 of a slide rail 40, both lie in a plane perpendicular to an imaginary central axis of the slide rail and overhanging side surfaces 51 of a plastic-made slidable shoe 50 of a movable runner 60 also lie in a plane perpendicular to an imaginary central axis of the slidable shoe 50. The overhanging side surfaces 51 of the slidable shoe 50 of the movable runner 60 on and along the corresponding slide surfaces 41 of the lips 43 of the slide rail 40. The above rail/runner structure, namely, webbing guiding structure does not develop problems so long as pulling, namely, downward forces are applied to the movable runner 60 along the imaginary central axis of the slide rail 40.

If a pulling force F is applied to the movable runner 60 by way of a webbing (not shown) connected to the movable runner 60 in the event of an emergency of an associated automobile, the movable runner 60 is caused to turn counterclockwise approximately about a point X so that the overhanging side surfaces 51 are brought into contact at a certain angle with their corresponding slide surfaces 41. As indicated by arrow b in FIG. 4, a left-hand edge portion of the left-hand overhanging side surface 51 undergoes substantially point-to-point contact with the left-hand slide surface 41 of the slide rail 40. This is attributed to the rail/runner structure that the slide surfaces 41 lie in the plane perpendicular to the imaginary central axis of the slide rail 40 and the overhanging side surfaces 51 lie in the plane perpendicular to the imaginary central axis of the slidable shoe 50.

As is apparent from FIG. 5, the movable runner 60 is constructed of an iron plate 53 connected to an unillustrated webbing, a pair of strength members 56 arranged on both sides of the iron plate 53 and united together with the iron plate 53 by pins 55. The plastic-made slidable shoe 50 covers the iron plate 53, strength members 56 and pins 55. When a situation similar to point-to-point contact arises between the left-hand edge portion of the left-hand overhanging side surface 51 and the corresponding slide surface 41 of the slide rail 40 as illustrated in FIG. 4, a large load is concentrated on a left-hand edge portion of the slidable shoe 50 as viewed in FIG. 5 so that the large load is not borne or supported by the left-hand strength member 56 and the slidable shoe 50 is hence sheared off there.

In addition, a shear force and a large bending moment are applied to each pin 55 at points proximal to both sides of the iron plate 53. The strength of the movable runner 60 must hence be enhanced structurally in its entirety, resulting in a drawback that the conventional movable runner 60 unavoidably becomes heavy in weight and large in dimensions.

SUMMARY OF THE INVENTION

An object of this invention is to solve the above-mentioned drawbacks of the conventional rail/runner structures and hence to provide a smaller and lighter rail/runner structure.

The present inventor has found that the above object can be achieved by arranging a contact surface, i.e., overhanging side surface of a slidable shoe and a slide surface of a slide rail at an angle relative to each other as viewed in a direction transverse to the slide rail.

In one aspect of this invention, there is thus provided a webbing guiding structure for an automobile seat belt system, which structure includes a slide rail and a movable runner displaceable along the slide rail. The slide rail defines a slide surface for allowing the movable runner to run on the slide surface. The movable runner is provided with a slidable shoe having a contact surface which is brought into contact with the slide surface of the slide rail. The contact surface and slide surface are arranged at an angle relative to each other as viewed in a direction transverse to the slide rail.

If a pulling force is applied to the movable runner of the webbing guiding structure according to this invention and the movable runner is tilted in the event of an emergency of an associated automobile, the contact surface of the movable runner is brought into contact with the slide surface of the slide rail not at its outer edge portion but at a portion inner than the outer edge portion. Accordingly, neither the movable runner nor the slide rail is subjected to a large bending moment. Therefore, the movable runner and slide rail can be formed smaller and lighter compared to conventional movable runners and slide rails. In addition, the movable runner is usually formed by covering a strength member with a plastic member. A large load applied to the movable runner as a result of the tilting of the movable runner is borne by the strength member, the plastic member is not sheared.

BRIEF DESCRIPTION OF THE DRAWINGS

The above and other objects, features and advantages of the present invention will become apparent from the following description of the invention and the appended claims, taken in conjuction with the accompanying drawings, in which:

DETAILED DESCRIPTION OF THE INVENTION AND PREFERRED EMBODIMENTS

Figure 1:
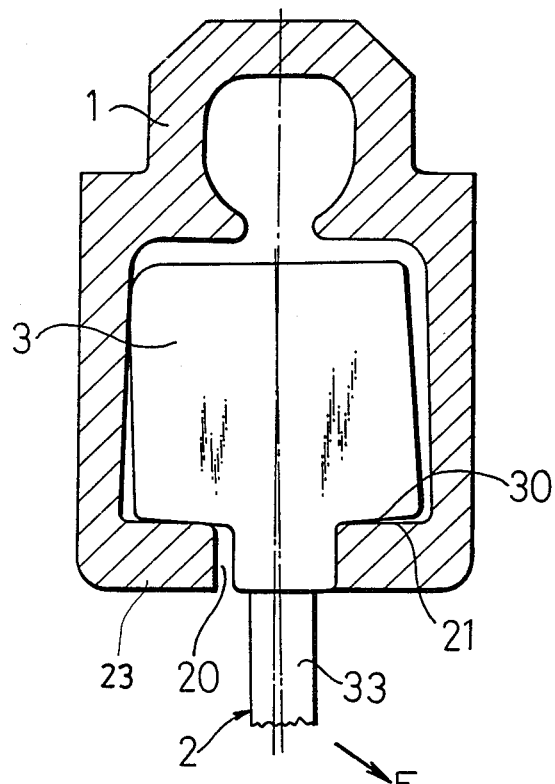
FIG. 1 is a transverse cross-sectional view of a webbing guiding structure according to a first embodiment of this invention.
Figure 2:
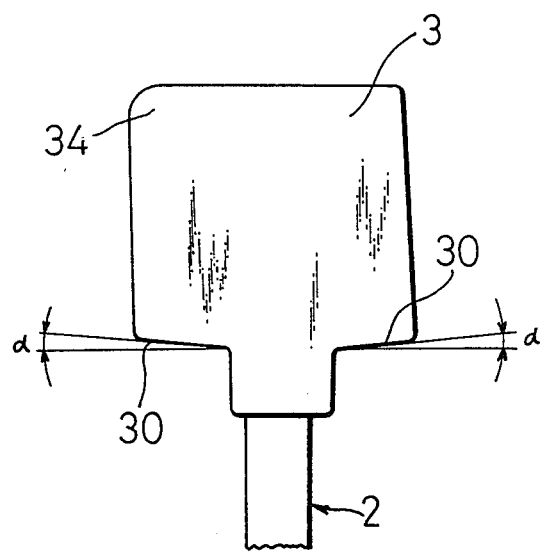
FIG. 2 is a front view of a slidable runner of the webbing guiding structure.
Figure 5:
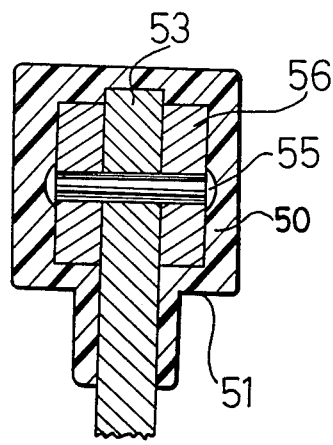
FIG. 5 is a transverse cross-sectional view of a slidable runner of the conventional webbing guiding structure.

Referring first to FIGS. 1 and 2, the webbing guiding structure according to the first embodiment of this invention will hereinafter be described. FIG. 1 shows a movable runner 2 and a slide rail 1 in combination. It should be noted that a pulling force F is being applied to the movable runner 2 in the illustrated state. As is apparent more clearly from FIG. 2, both overhanging side surfaces 30 of a slidable shoe 3 are provided at a certain angle α relative to a plane perpendicular to an imaginary central axis of the slidable shoe 3. The slidable shoe 3 is arranged inside the slide rail 1 in such a way that the overhanging side surfaces 30 of the slidable shoe 3 are maintained, at locations close to a slot 20 of the slide rail 1, in contact with slide surfaces 21 formed on upper surfaces of lips 23 of the slide rail 1. Even when the pulling force F is applied and the slidable shoe 3 is tilted, the contact between the left-hand overhanging side surface 30 and the left-hand slide surface 21 takes place at an inner location compared to the conventional webbing guiding structures. In the first embodiment, strength members similar to the strength members 56 shown in FIG. 5 are located inside a plastic-made slidable shoe 3. A load applied to the slidable shoe 3 is transmitted to the strength members, whereby the slidable shoe 3 is not sheared. In addition, the contact occurs near the slot 20 and the bending moment applied to an iron plate 33 is reduced correspondingly. The strength requirement for the webbing guiding structure can therefore be reduced, so that the webbing guiding structure can be constructed smaller.

The configuration of the slidable shoe 3 is depicted in FIG. 2. It is preferable that the configuration is not completely symmetrical relative to an imaginary central vertical axis of the slidable shoe 3 as viewed in FIG. 2 and an upper side edge 34, which is brought into contact with the slide rail 1 by the pulling force F, is rounded. In this case, the contact between the slidable shoe 3 and a side wall of the slidable rail 1 takes place at a location a certain distance the way down from the upper edge of the shoe 3. A load applied to the contacted part of the slidable shoe 3 is therefore transmitted to and borne by the strength member. The slidable shoe 3 is not sheared there accordingly.

Figure 3:
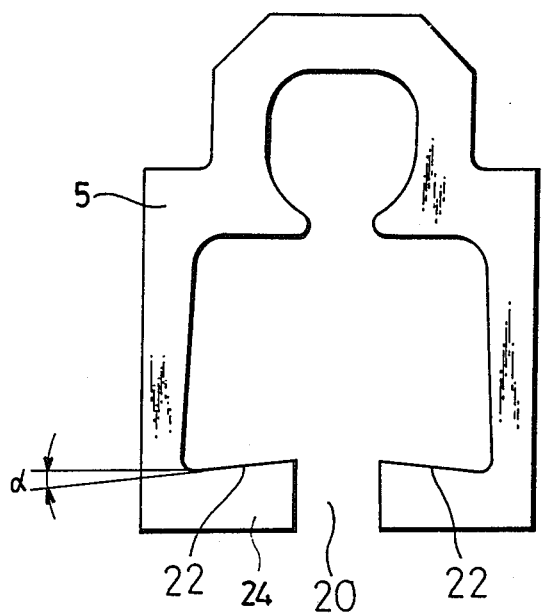
FIG. 3 is a front view of a rail guide of a webbing guiding structure according to a second embodiment of this invention.
Figure 4:
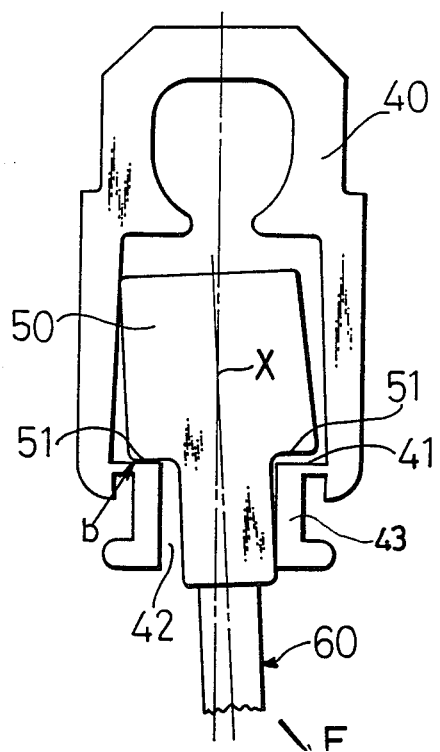
FIG. 4 is a front view of a conventional webbing guiding structure.

A similar mode of contact can be achieved even when the configuration of the slide rail 5 is modified as shown as the second embodiment of this invention in FIG. 3. In the second embodiment, slide surfaces 22 formed on lips 24 which define the slot 20 extend inwardly and upwardly at the angle α relative to a plane perpendicular to an imaginary vertical central axis of the slide rail 5, so that the lips 24 have a greatest thickness in adjacent to the slot 20. When a slidable shoe having overhanging side surfaces perpendicular to an imaginary central axis thereof like the slidable shoe 50 of the conventional webbing guiding structure of FIGS. 4 and 5 is arranged inside the slide rail 5, one of the overhanging side surfaces of the slidable shoe, for example, the left-hand overhanging surface is brought into contact with its corresponding slide surface 22 at an inner location as in the first embodiment when a pulling force is applied as shown in FIG. 1. Like the first embodiment, the second embodiment can also materialize the preferable state that no load is concentrated on an outer edge portion of the slidable shoe. It is also preferable to bevel or round the slidable shoe at an upper edge portion which is brought into contact with its corresponding side wall of the slide rail 5 when a pulling force is applied as shown in FIG. 1.

I claim:

1. In a webbing guiding structure for an automobile seat belt system, said structure including a slide rail and a movable runner displaceable along the slide rail, the improvement wherein the slide rail defines a slide surface for allowing the movable runner to run on the slide surface, the movable runner is provided with a slidable shoe having a contact surface which is brought into contact with the slide surface of the slide rail, the slidable shoe is received in the slide rail, the movable runner extends outwardly at a part thereof through a slot formed in the rail, and the slide surface extending from one of edges of the slot and the contact surface of the slidable shoe are formed in such a way that the interval between the slide surface and the contact surface increases as the distance from the edge becomes greater.

2. The structure as claimed in claim 1, wherein the slide surface and contact surface are essentially planar.

3. The structure as claimed in claim 2, wherein the slide surface of the slide rail extends substantially in a horizontal direction as viewed in the direction transverse to the slide rail and the contact surface of the slidable shoe extends aslant at an angle alpha relative to a transverse axis of the slide rail.

4. The structure as claimed in claim 2, wherein the contact surface of the slidable shoe extends substantially in a horizontal direction as viewed in the direction transverse to the slide rail and the slide surface of the slide rail extends aslant at an angle alpha relative to a transverse axis of the slide rail.

5. The structure as claimed in claim 1, wherein the movable runner has an iron plate to be connected to a webbing and a pair of strength members arranged on both sides of the iron plate as viewed in the direction of the thickness of the iron plate, and the slidable shoe surrounds the strength members.

6. The structure as claimed in claim 5, wherein the slidable shoe is made of a plastic material.

7. In a webbing guiding structure for an automobile seat belt system, said structure including a slide rail and a movable runner displaceable along the slide rail, the improvement wherein the movable runner is provided with a slidable shoe at a position where the movable runner is brought into contact with the slide rail, the slidable shoe is arranged inside the slide rail and has a substantially rectangular contour in a transverse cross-section thereof, and at least one of upper edges of the slidable shoe, said edges being on a side remote from a portion connected to an associated webbing, is beveled.

8. The structure as claimed in claim 7, wherein said at least one of the upper edges is rounded.

9. The structure as claimed in claim 7, wherein the movable runner has an iron plate to be connected to a webbing and a pair of strength members arranged on both sides of the iron plate as viewed in the direction of the thickness of the iron plate, and the slidable shoe surrounds the strength members.

10. The structure as claimed in claim 9, wherein the slidable shoe is made of a plastic material.

* * * * *